US005363093A

United States Patent [19]
Williams et al.

[11] Patent Number: 5,363,093
[45] Date of Patent: Nov. 8, 1994

[54] METHOD AND APPARATUS FOR CONTINUOUS TANK MONITORING

[75] Inventors: Barry N. Williams, Rosharan; Glenn A. Kauffmann, Pasadena, both of Tex.

[73] Assignee: Tanknology Corporation International, Houston, Tex.

[21] Appl. No.: 928,278

[22] Filed: Aug. 11, 1992

[51] Int. Cl.[5] .............................................. G08B 21/00
[52] U.S. Cl. .................................. 340/605; 340/618; 364/509; 73/40
[58] Field of Search ............... 340/605, 612, 618, 620; 364/509, 550, 564; 73/49, 1 H, 40

[56] References Cited

U.S. PATENT DOCUMENTS

| | | |
|---|---|---|
| 4,349,882 | 9/1982 | Asmundsson et al. |
| 4,406,152 | 9/1983 | Palmer et al. |
| 4,589,077 | 5/1986 | Pope. |
| 4,706,203 | 11/1987 | Ramsdale et al. |
| 4,716,536 | 12/1987 | Blanchard ........................ 364/509 |
| 4,736,329 | 4/1988 | Ferretti et al. ................... 364/509 |
| 4,740,777 | 4/1988 | Slocum et al. ................... 340/522 |
| 4,788,648 | 11/1988 | Ferretti et al. ................... 364/509 |
| 4,789,946 | 12/1988 | Sinz ................................. 364/509 |
| 4,850,223 | 7/1989 | Carlin et al. ..................... 73/49.2 |
| 4,852,054 | 7/1989 | Mastandrea ..................... 364/509 |
| 4,876,530 | 10/1989 | Hill et al. ......................... 340/605 |
| 4,954,973 | 9/1990 | Jacob et al. ...................... 364/551.01 |
| 4,977,528 | 12/1990 | Norris .............................. 364/571.04 |
| 4,993,257 | 2/1991 | Lagergren ....................... 73/49.2 |

FOREIGN PATENT DOCUMENTS

| | | |
|---|---|---|
| 3088007 | of 0000 | European Pat. Off. |
| 617008 | 7/1977 | Switzerland. |
| 1575548 | 9/1980 | United Kingdom. |
| 2120482 | 11/1983 | United Kingdom. |
| 2138947 | 10/1984 | United Kingdom. |

*Primary Examiner*—John K. Peng
*Assistant Examiner*—Tim Johnson
*Attorney, Agent, or Firm*—Vaden, Eickenroht, Thompson, Boulware & Feather

[57] ABSTRACT

Method and apparatus for continuously monitoring the volume of liquid in an underground storage tank and producing data for reconciling volume with throughput. This invention provides a set of algorithms and hardware which allows the loss of product caused by equipment failure or pilferage to be determined in one day or less. In order to accomplish this task this system requires a mechanism in each tank which is capable of indicating liquid depth and temperature to a very high degree of accuracy, a water table indicator, data collection equipment for the dispenser metering system, a local computer system for calculating several algorithms and a second computer, either local or remote, which calculates the daily reconciliation and finds the source of any indicated errors. This second computer also provides reports to the tank operator and activates an alarm system in case there is a loss due to a leak in any part of the tank system.

12 Claims, 4 Drawing Sheets

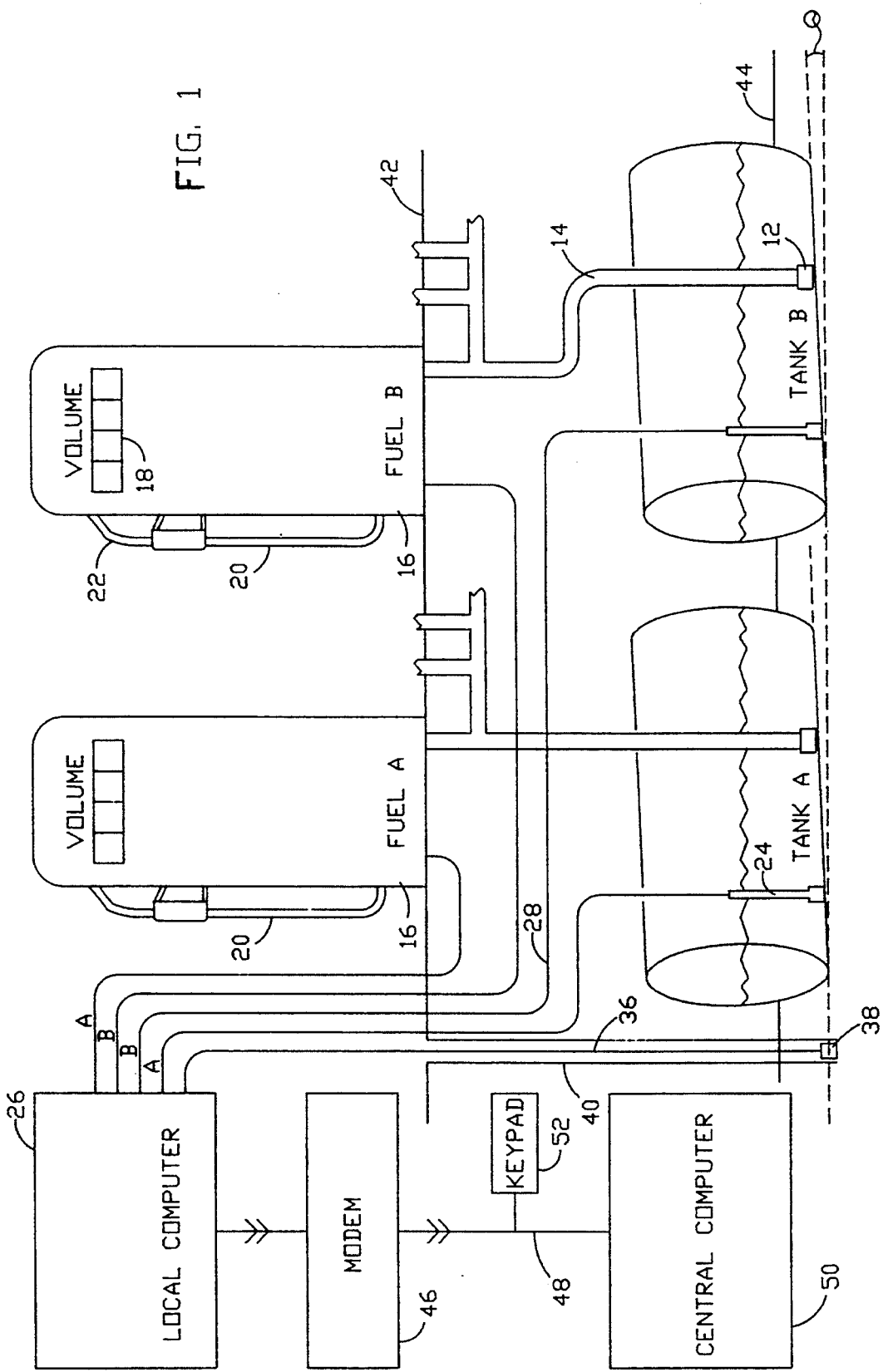

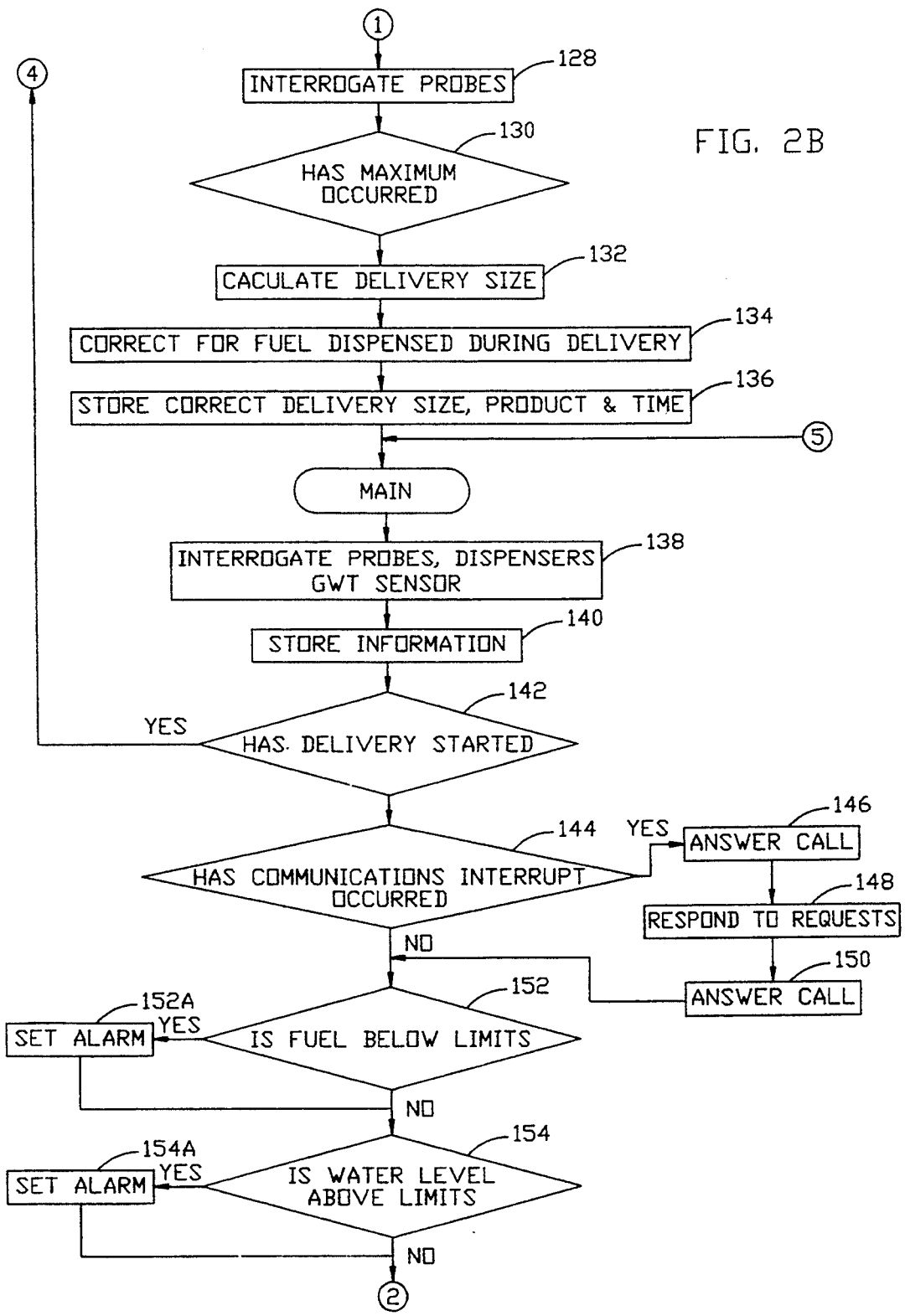

METHOD AND APPARATUS FOR CONTINUOUS TANK MONITORING

BACKGROUND OF THE INVENTION

The present invention relates to a method and apparatus for determination of an equipment failure or pilferage in a tank storage system having the ability to detect such failure or pilferage in a short period of time. More particularly, the present invention relates to a precision tank monitoring system and inventory reconciliation algorithm which accounts for all relevant variables, including dimensional variances in the tank, calibration of output metering systems, and delivery shortages or overages.

In a tank storage facility it is important to determine whether all materials can be accounted for. The United States Environmental Protection Agency (E.P.A.) requires the owner of a storage facility to account for all material in order to insure that there is no loss of material to the environment. The requirements stated by the E.P.A. include a tank precision tightness test or a monitoring system which has the capability to find small leaks. For an underground storage facility containing fuel such as gasoline, diesel, or jet fuel, the requirements include that either a precision test be run at least every five years (a precision test system must be certified capable of finding a 0.1 gallon per hour (g.p.h.) leak), or the tank be fitted with a monitoring system capable of detecting a 0.2 g.p.h. leak. In addition the inventory must be reconciled to a limit not greater than 1% of throughput plus 130 gallons on a monthly basis. If the inventory cannot be reconciled, a "show cause" rule requires that the tank owner show why the tank system is out of compliance. In addition if the failure is due to a loss of material into the environment, the tank owner is liable for the remediation of the problem, and may be subject to fines levied by the regulatory agencies. It is evident that the operator or owner of a tank storage facility needs a system which can reconcile the inventory and provide an early warning of an equipment failure which leads to a loss of material.

The equipment technology of the past has allowed owners to choose among systems which are capable of detecting a material loss to the environment and inventory reconciliation systems, including statistical inventory reconciliation, or automatic tank gauging systems. One method used to measure for a material loss to the environment is to place liquid or vapor detectors around the equipment as shown in U.S. Pat. Nos. 4,740,777 and 4,646,069. In case of a loss, it is evident that there must be contamination of the environment before an alarm state is indicated by such equipment. In addition, this method requires a separate inventory reconciliation system.

Statistical inventory analysis services as currently practiced by one vendor requires the tank operator to take daily recordings of the fluid height in each tank to an accuracy of ⅛ inch and supply this information, along with the total amount of fluid dispensed from the tank, and the total amount of fluid added to the tanks to a vendor who then reconciles the data each month. After a period of one or more continuous months of gathering this data the vendor of the service professes to be able to statistically determine a loss rate if that loss rate exceeds 0.2 g.p.h. The limitation to this system is that a loss to the environment may continue for a period of one or more months before detection. In practice this period may be shorter if the loss rate is higher, however, at higher loss rates, other detection methods may react first.

A second method which is currently practiced uses permanently mounted probes in the tank to provide an inventory reconciliation tool which is alleged to be capable of running a precision tank tightness test as well as to provide a continuous indication of gross volume of material in the tank along with a net volume corrected to a specified temperature. These systems must be supplied with a table (called a strapping chart) which indicates the volume of the tank versus the height or depth of material in the tank. In addition, these systems require that a coefficient of expansion be supplied in order to correct the gross volume to a net volume of material at a standard temperature. It has been noted by the vendors of this equipment that the table of height versus volume for a particular tank provided by the tank manufacturer is not accurate enough to allow inventory reconciliation. In an attempt to correct this problem, at least one vendor has patented a system to correct this table by assuming that the reconciliation data from the sensors and the delivery meter system is correct and calculating the table from this data (see U.S. Pat. No. 4,977,528). This patent discloses that the table is created by a process of iteration until further iterations reduce the accuracy of the table. It should be noted that these systems reconcile inventory on a monthly basis, although it is possible for these systems to detect a leak in the tank with a shorter delay.

It has been noted that a system which can reconcile data on a daily basis would be desirable if the equipment were available. In addition, the ability to determine the source of any failure in reconciliation would be desirable. Known systems have not been able to provide this capability.

SUMMARY OF THE INVENTION

The present invention, however, provides this capability by monitoring the depth of the liquid in the tank, calculating the volume of the liquid in the tank from the measured depth at selected time increments over a predetermined period of time, and correcting for any variation between actual volume and calculated volume resulting from conditions external to the tank. These external conditions may include, among other things, the manner in which the tank was installed, the tilt at which the tank was installed, the flattening of the bottom of the tank, and changes in ambient temperature. The change in the corrected volume at each time increment is compared to the volume of liquid dispensed from the tank over the predetermined period of time and a warning signal is produced if the discrepancy exceeds a predetermined limit. If the predetermined limit is not exceeded, a correlation coefficient between the volume change and the volume dispensed is calculated and stored to memory then, as correlation coefficients from successive additional predetermined periods of time are calculated and stored to memory, the stored correlation coefficients are compared to yield information as to the source of any discrepancy between volume change and volume dispensed.

BRIEF DESCRIPTION OF THE DRAWINGS

FIG. 1 is a schematic diagram of a presently preferred embodiment of the present invention.

FIGS. 2A-C are a flow chart summarizing the functions of the control software of the apparatus of FIG. 1.

DETAILED DESCRIPTION OF THE PREFERRED EMBODIMENT

Figure 2A:
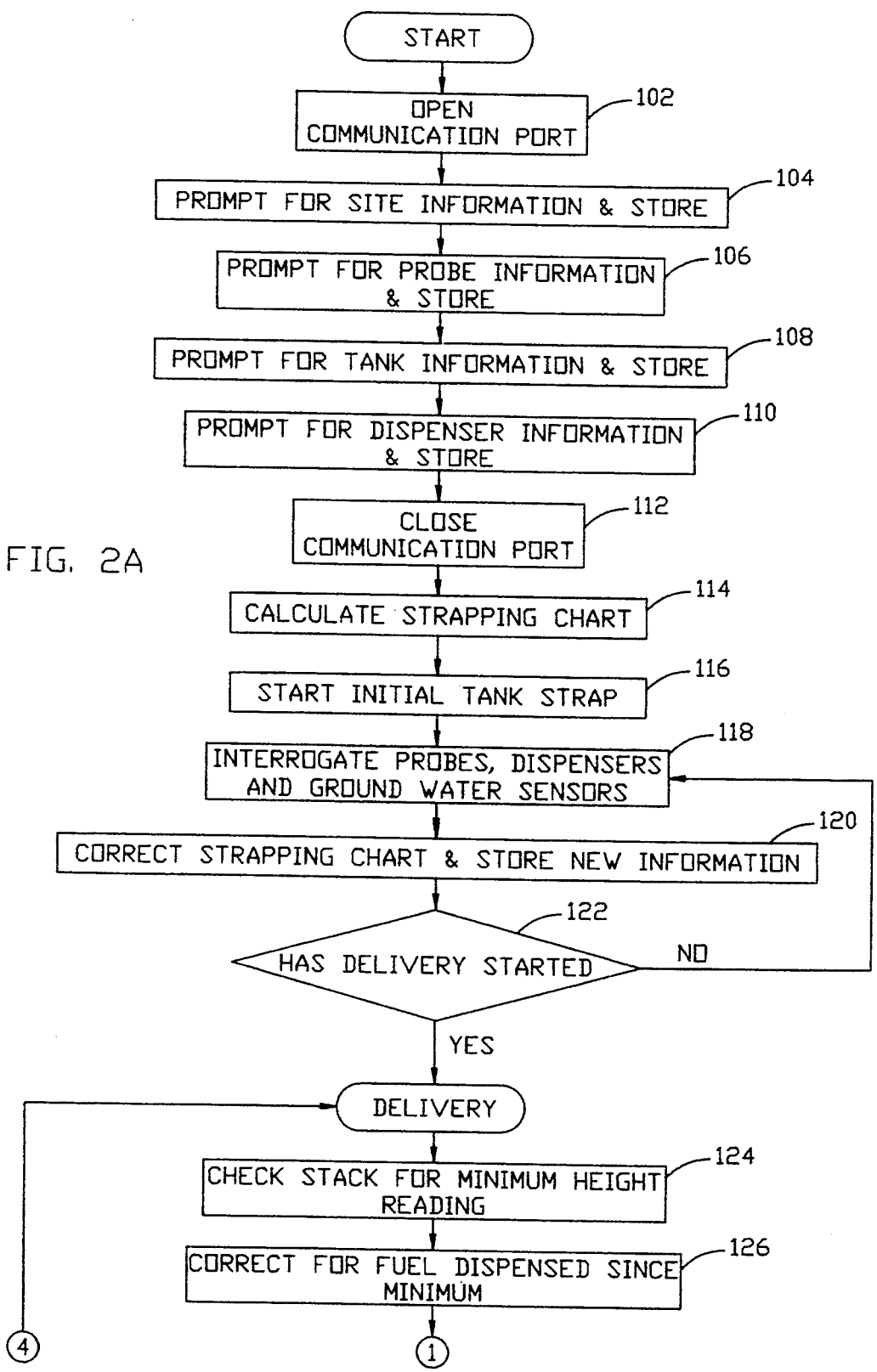

A monitoring system constructed in accordance with the teachings of the present invention is shown in FIG. 1 as having been installed in an underground storage tank facility for use in the sale of gasoline or other fuels to the public. The facility includes two underground storage tanks A and B with their respective pumps 12, piping 14 and dispensers 16. As fuel is pumped through dispensers 16, it passes the respective totalizers 18 before entering the hoses 20 to which nozzles 22 are attached for directing fuel into a vehicle.

A magnetostrictive probe 24 (MTS Sensors, Inc., Research Triangle Park, N.C.) is positioned on the bottom of each of tanks A and B and connected to local computer 26 by leads 28. Probe 24 communicates with local computer 26 through signal conditioning circuits (not shown) using a 50 mhz clock along with suitable prescalers and a counter integrated in the processor for digitizing the time domain signal. The probe includes the capability to provide the height of the fluid as well as the temperature of the fluid in six positions along the probe length. This output includes a train of 128 interrogations of the height of the fluid along with a time domain signal which indicates the temperature at the sensors. This gives a basic resolution of 0.0027 inches for a single sample. It is known that if the signals are not synchronized, the resolution can be improved by a factor equal to the square root of the number of samples. This gives a height resolution of 0.00025 inches. In addition, for certain measurements the probe height information is queried multiple times, this additional integration time allowing a total resolution of 0.0001 inches. The temperatures are similarly sampled and integrated to give a resolution of 0.001 degrees Fahrenheit.

The apparatus also includes a pulser (not shown) located at the fuel dispensers 16 and available from Western Electronics, Inc. to which event counters (DGH, Inc.) are attached and adjusted to produce a single count for each 0.1 gallons which pass through dispensers 16. The output of the event counters is routed through leads 34 to local computer 26.

Also connected through signal conditioning circuitry (not shown) including voltage amplifiers and digitizing circuits and lead 36 to the local computer 26 is a water table sensor 38. Water table sensor 38 is a differential pressure transducer (Sensym, Inc., Sunnyvale, Calif.) set in a monitor well 40 at a point level with the bottom of tanks A and B. One side of the transducer is brought to ground level 42 and the other communicates with the fluid in monitor well 40, in this case, water since the tanks A and B are installed below the water table 44.

Means is provided in the form of a serial port on computer 26 connected to a modem, indicated generally at reference numeral 46, for communicating data by telephone line 48 from local computer 26 to a remotely situated main computer 50. Provision is made, in the form of a keypad 52 located at the site of tanks A and B, for input from the facility operator or for calibration and diagnostics purposes.

After installation of the probe 24 in tanks A and B, pulsers and event counters on dispensers 16, and water table sensor 38 in monitor well 40, tanks A and B are filled with fuel and tank tightness tests are conducted on both tanks, preferably in accordance with the method described in U.S. Pat. No. 4,462,249, assigned to the assignee of the present invention, to insure that the tanks and piping are free from leakage. In addition, the dispensers 16 are calibrated by metering the fuel into a calibrated container. The dispenser is then adjusted and fluid is again metered into the calibrated container and the dispenser is adjusted, all as known in the art. This process is repeated until variance is less than 0.05%.

A volume versus depth table is then calculated for each tank A and B and stored in the memory of local computer 26. This table is calculated from the tank dimensions using any of several formulas which can be derived for calculating the volume of a liquid contained in a nominal right angle cylinder from the depth of the liquid. Two formulas which have been used to advantage in connection with the present invention are as follows:

$$\text{Volume} = \left[ R^2 \cos^{-1}\left(\frac{R-h}{R}\right) - (R-h)\sqrt{2Rh - h^2} \right] L$$

(where R=radius of tank; h=height, or depth, of the liquid in the tank; and L=length of tank; the derivation involving a determination of the volume of a section of the cylinder defined from the center axis of the cylinder and the plane of the surface of the liquid contained therein, less the portion of that section which is not filled (e.g., the $$(R-h)\sqrt{2Rh - h^2}$$

term) with liquid) and $$\text{Volume} = \left[ \frac{\pi R^2}{2} - \left( X\sqrt{R^2 - X^2} + R^2 \sin^{-1}\frac{X}{R} \right) \right] L$$

(where X is R-h).

In the next step of the method, a volume versus depth table for each of the tanks is created by strapping each tank, preferably in accordance with the following method. The strapping chart is provided by a method which contemplates the flexing of the walls of the underground storage tank in response to ambient conditions, the pressure of liqud in the tank, or other factors external to the tank which cause the walls of the tank to vary from their nominal shape so that the volume of liquid is accurately determined from a measurement of the depth of the liquid in the tank. That method comprises the steps of pumping a preciely measured volume of liquid from the underground storage tank for which the strapping chart is to be provided out of the tank, measuring the change in the depth of the liquid in the underground storage tank resulting from the removal of the precise volume of liquid therefrom, and reversing the pump and returning the liquid to the tank while continuing to measure and store depth and volume data to the memory of a computer. The depth measurements are then interpolated to obtain volume measurements at selected increments of the depth of the liquid during the pumping of the liquid out of the tank and the returning of liquid to the tank, and the two interpolated measurements at each depth increment are then averaged. Any discrepancies between calculated and actual volume/- depth relationships are then used as a correction for the calculated table.

As shown in FIG. 1, the tanks A and B are installed at an angle $\theta$ relative to ground level 42 which contributes to the discrepancy between volume calculated as a function of the depth of the fuel in the tanks and actual volume when small volumes of fuel are contained in the tanks. To compensate, or correct, the calculated volume to more closely approximate actual volume at fuel depths which are such that the entire bottom of the tank is not covered by fuel, the angle $\theta$ is measured using the apparatus described in co-pending application Ser. No. 07/833,306, filed on Feb. 10, 1992, patented on Aug. 25, 1992, U.S. Pat. No. 5,140,753 also assigned to the assignee of the present invention, and hereby incorporated herein in its entirety by this specific reference thereto. Once the angle $\theta$ has been determined, a table of volume versus depth at those depths at which the bottom of the tank is not entirely covered by fuel is constructed by utilizing trigonometric functions to determine the length 1 along the bottom of tank A or B having a length L which is wetted by the fuel in the tank as follows:

$$X = X_0 + l \tan \theta,$$

where $X_0$ is the minimum distance from the tank centerline to the liquid level, $\theta$ is the angle at which the tank is inclined with respect to the horizon, r is the radius of tank A or B (assumed to be generally round in crosssection), and X is the vertical distance from the center line of tank A or B to the surface of the fuel contained therein. Having defined this relationship, the volume of liquid removed during the time between fluid levels of $X_N$ and $X_{N+1}$ is defined by:

$$V = \int_0^L \left[ \left[ \frac{(X_o + l_{N+1}\tan\theta)}{2} \sqrt{r^2 - (x_0 + l_{N+1}\tan\theta)^2} \; \frac{r^2}{2} \sin^{-1}\left(\frac{X_0 + l_{N+1}\tan\theta}{r}\right)\right] - \left[\frac{X_0 + l_N\tan\theta)}{2} \sqrt{r^2 - (X_0 + l_N\tan\theta)^2} + \frac{r^2}{2} \sin^{-1}\left(\frac{X_0 + l_N\tan\theta}{r}\right)\right]\right] dl,$$

where 1 is the length of the liquid along the bottom of the tank. Rather than completing a rigorous solution to this equation, the preferred method for correlating values of X and 1 to the recorded volume of liquid removed by the pumping system is to solve the equation at several specific values of X and 1. The resulting data is then recorded in the memory of local computer 26 as the volume corresponding to the depth measurements taken below the liquid depth at which the entire bottom of tank A (or B) is no longer wetted (note that the corrections to the depth measurements described infra further improve this depth/volume relationship).

In addition to corrections to the volume versus depth table produced by the strapping of tanks A and B, in one preferred embodiment of the present invention, a correction is made for the flattening of the bottom of the tank caused by the installation of the tank and the filling of the tank with fuel. This correction is made mathematically from a measurement of the degree of flattening of the bottom of the tank, preferably made in accordance with the teachings of co-pending application Ser. No. 07/763,332.

Having produced a corrected volume versus depth table in this matter and stored that table in the memory of local computer 26, the monitoring apparatus of the present invention is allowed to monitor the dispensing of the first tank full of fuel. A table of discrepancies between the stored volume versus depth table and the table resulting from measurements of fuel depth and volume dispensed from the dispenser 16 at selected time increments over a predetermined period of time is produced and used to modify the stored volume versus depth table, the modified table being likewise stored to memory in local computer 26.

Local computer 26 therefore receives data on the depth of fuel in the tank, the temperature, amount of product dispensed, and a height versus volume table for the tank. With this information, the computer is capable of recording all fluid added to the tank, performing a precision volumetric tank tightness test, measuring all deliveries, verifying that fuel is being removed from the tank only through the dispenser, and totalizing the flow through each dispenser. The local computer 26 is also capable of running a precision tightness test by monitoring the volume for a several hour period in which there is no product either added or removed from the tank. After temperature effects are corrected, there should be no net change in material in the tank over this time period.

The local computer 26 then makes all this information available to the central computer 50. The central computer 50 is used to reconcile all data and present an alarm when either the reconciliation fails for that day, or the system has sensed a loss of fluid when no dispenser is in use. If the data does not reconcile perfectly yet is within a predetermined limit, for instance, 1% of throughput plus 4 gallons variance, the central computer 50 also calculates a coefficient of the daily reconciliation variance based on the relative throughput of volume of each dispenser 16, total throughput of the system, and time. The correlation coefficient is calculated by multiple regression analysis using the daily inventory discrepancies as the dependent data set and the total time, dispensing time (e.g., the period of time during which the pump 12 is operating), and each dispenser's throughput as the independent data sets The result is several values of $R^2$, and if one of the values is significantly greater than the others, the particular value indicates the component of the system to check. The daily reconciliation data is especially useful for detection of dispenser calibration drift. It is known that the calibration of the dispensers tends to drift very slowly, with an abrupt change being very rare. Therefore if the variance of reconciliation begins to increase slowly, and the drift is greater during the periods when one particular dispenser receives more use than the others, then the probability is that this particular dispenser is drifting toward the limits of its calibration. If instead the variance is greater with greater throughput, but does not appear to be related to a particular dispenser, the failure is more likely to be a failure in the distribution line, as this line is under pressure at any time the product is being dispensed, no matter which dispenser is in use. If the leak appears to be related to time as opposed to throughput or the increased use of a particular dispenser, the failure could be a tank leak. The possibility of a tank leak can be proven or disproved by conducting the precision tank test described above.

As is evident from the above discussion, the method and apparatus of the present invention is capable of daily reconciliation with a very small variance. These small variances are analyzed statistically to determine the probable cause of the variances. This capability is due to the different behavior of a failure in each of the relevant areas. The most probable failures are as follows:

1. Leaks in the piping system;
2. Leaks in the tanks;
3. Calibration drift of the dispensers; and/or
4. Variances in the table relating volume to height in the tank.

This latter source of failure generally results from a factor external to the tank, for instance, a seismic disturbance, a change in the fuel or other product stored in the tank, or a change in the height of the water table 44. Because changes in the water table height are relatively common, the local computer 26 monitors water table height by interrogating pressure transducer 38 continually, producing a signal to notify of such a change to the central computer 50. Daily reconciliation data is then checked after such a signal is received for an abrupt change and, if such a change is detected, the tank is re-strapped and/or checked for leaks using the precision tank tightness test described above.

Another source of abrupt change in the reconciliation data is a product delivery. For that reason, an increase in the depth of the liquid in the tank of more than some predetermined minimum, for instance, 0.005 inches, is flagged for handling by local computer 26 in the following manner. At the time of the increase, local computer 26 is holding, for instance, two or three minutes of depth data. The control software, upon detecting an increase in depth, looks back over the data from that period to the point at which no increase in depth was noted, holds that value, and continues monitoring depth until no further increase in depth is noted, at which time the system returns to the normal monitoring mode. Although not looked upon with favor in the industry, there may also be times when product is being dispensed at the same time it is being delivered. For this reason, if local computer 26 receives an input from the event counter on dispenser 16 while product depth is being sampled in this product delivery, or stand-by mode, the volume dispensed is added to the volume change resulting from the delivery. Alternatively, the dispensers 16 are disabled whenever product depth is sampled in this stand-by mode.

Figure 2C:
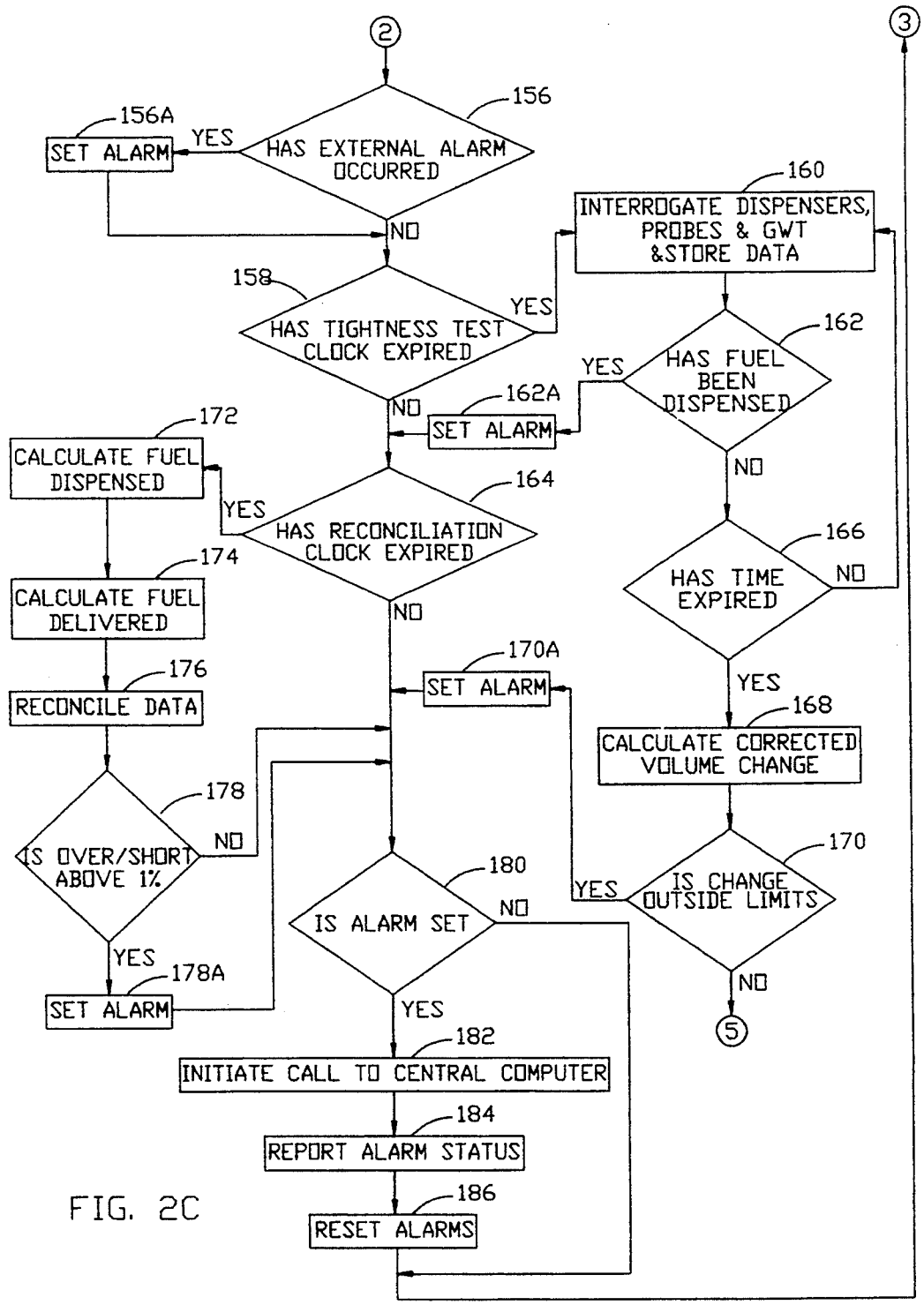

Referring now to FIG. 2, the method of the present invention will now be described by reference to the logic of the control software loaded into local computer 26. Referring first to FIG. 2A, a start routine is initiated with the opening of an internal communications port (step 102) followed by prompting for site information (step 104), probe information (step 106), tank information (step 108), and dispenser information (110), all of which is stored to memory in local computer 26. This information is either entered manually from keypad 52, communication from central computer 50, or, in the case of certain dispensers, the probe 24, and/or other onsite equipment, available from the outputs of that equipment. This information may include, for instance, tank dimensions and tilt, identification of the individual dispensers, and calibration data from probe 24. The communications port is then closed (step 112) and (referring to FIG. 2B) an initial strapping chart calculated (step 114) using one of the algorithms set out above.

The resulting volume versus depth table is stored to the memory of local computer 26 and then the tank is strapped in accordance with the method described in the above-incorporated co-pending application Ser. No. 07/914,479 (step 116) using the output from probe 24 to provide depth data (step 118). The strapping chart calculated at step 114 is then corrected by any discrepancies between the calculated and actual volumes at each depth (step 120) and the corrected strapping chart stored to memory.

As described in co-pending application Ser. No. 07/914,479, strapping is accomplished by pumping the fuel in the UST out of the UST while measuring the volume removed from the tank and then returning the fuel to the tank. That return of fuel is seen by the computer 26 as a delivery (step 122) which causes entry into the delivery routine. As described above, that routine commences with a check of the memory of computer 26 (referred to in FIG. 2B as the "stack") for the last depth reading before the "delivery" began (step 124), which is then corrected for the volume of fuel dispensed (if any) since that reading was recorded (step 126), the probe 24 repeatedly interrogated (step 128) and, once a maximum depth is recorded (step 130), the delivery size, or volume, is calculated (step 132) and corrected by the volume dispensed while the delivery was being made (step 134). The corrected delivery, size, product, and time are then stored to memory (step 136) before entering the main routine.

The main routine commences with timed, repeated interrogation (step 138) of the probe 24 in each tank A and B, the dispensers 18, and pressure transducer 38 (denoted "GWT sensor" for "ground water table sensor" in FIG. 2A) and storage of each data value to memory (step 140). As before, an increase in the depth of the fuel reported by probe 24 (if any) is interpreted as a delivery such the delivery routine is entered at step 142; interrogation is also interrupted by communications with central computer 50 (step 144). In the latter event, the central computer's inquiry is recognized (step 146), local computer 26 downloads stored data at the request of central computer 50 (step 148) and is then reset for data acquisition (step 150). In the absence of a communications interrupt, or after step 150, the main routine continues by checking whether the depth of the fuel in the tank A or B is below a pre-set limit (step 152), an output from pressure transducer 38 indicating an increase in the height of the water table (step 154), or for other external input such as from the sacrificial anode (not shown) in the tank A or B, keypad 52 (e.g., in the event of seismic activity), or other stimulus resulting from a factor external to the tank (step 156), each capable of setting a corresponding alarm 152A, 154A, or 156A, until the test clock expires (step 158).

In the event the test clock has timed out, the probes 24, dispensers 18 and ground water table pressure transducer 38 are interrogated once again (step 160) and a check is made (at step 162) to determine whether the fuel depth reported by probe 24 is low enough that the tank A or B is "empty" (it being understood that, in normal operation, the tank would not be allowed to drop below some operator selected depth, e.g., 25% of capacity, before additional product would be delivered such that reference to the word "empty" should be construed as being a reference to the depth of the product which remains in the tank when the tank operator replenishes the tank), in which case an alarm is set (step 162A) and the so-called "reconciliation clock" is checked for expiration (step 164). The reconciliation clock is the clock (internal to local computer 26) which is set, for instance, on a 24 hour cycle to provide daily reports to central computer 50 as described below. If the tank is not reported as "empty" at step 162, a check is made to determine whether the time has expired (step 166). If not, the various inputs are again interrogated as described at step 160 and the loop is repeated until the check at step 162 indicates an "empty condition". If time has expired at step 166, a corrected volume change (corrected for temperature expansion/contraction) is calculated (step 168) so as to provide a precision tank tightness test by which the corrected change is checked against a predetermined limit (step 170). If that limit is exceeded, an alarm is set (step (170A) and central computer 50 is so-informed as described below. If not, the local computer 26 re-initiates the main routine.

As noted above, the reconciliation clock is checked at step 164, and if the time has expired, the amount of fuel that has been dispensed is calculated (step 172), the amount of fuel delivered is calculated (step 174), and the data reconciled (step 176). If the calculated data does not reconcile within, for instance, the above described 1% limit (step 178), an alarm is set (step 178A) and the central computer 50 is so informed; if the data does reconcile, the local computer proceeds to step 180, at which the various alarms are checked. If no alarms have been enabled, the local computer 26 reinitiates the main routine. If a check of the alarms at step 180 indicates that one or more of the alarms is set, a call is initiated to central computer 150 (step 182) to report the alarm status (step 184) and then the alarms are re-set (step 186) and local computer 26 returns to the main routine.

Although described in terms of the presently preferred embodiment, those skilled in the art who have the benefit of this disclosure will recognize that certain changes can be made to this specific embodiment without changing the manner in which the component parts thereof function to achieve their intended result. For instance, instead of a local and a central computer, all of the functions of both computers can be accomplished by a single, on-site computer. This, and all other such changes, is intended to fall within the spirit and scope of the following claims.

What is claimed is:

1. A method of continuously monitoring the level of the liquid in a liquid dispensing system including an underground storage tank and a pump including a dispenser for providing an output indicative of the volume of liquid pumped out of the tank comprising the steps of:
    (a) monitoring the depth of the liquid in the tank;
    (b) calculating the volume of the liquid stored in the tank from the depth of the liquid at selected time increments over a predetermined period of time;
    (c) correcting the calculated volume at each time increment for any variation between actual volume and calculated volume resulting from conditions external to the tank;
    (d) comparing any change in the corrected volume at each time increment over the predetermined period of time to the volume of liquid dispensed from the tank;
    (e) producing a warning signal if the discrepancy between change in corrected volume and volume dispensed exceeds a predetermined limit;
    (f) if the change in volume and the volume dispensed does not exceed the predetermined limit, calculating a correlation coefficient between the change in volume and the volume dispensed and storing the correlation coefficient to memory;
    (g) repeating steps (a)–(f) over successive predetermined periods of time, storing the correlation coefficient from each period; and
    (h) comparing the stored correlation coefficients from each time period.

2. The method of claim 1 wherein the tank is strapped to provide a table of corrections for the discrepancy between calculated volume and actual volume.

3. The method of claim 2 wherein the table of corrections includes a correction for the effect of the tilt of the tank on the volume of liquid in the tank.

4. The method of claim 3 wherein the table of corrections includes a correction for the effect of the tilt of the tank on the volume of liquid in the tank at liquid depths at which the liquid does not cover the entire bottom of the tank.

5. The method of claim 1 wherein steps (a)–(d) are conducted by a computer installed at the site of the liquid dispensing system, steps (e)–(h) being conducted by a computer at a remote location after the comprisions of the change in corrected volume and the volume of liquid dispensed are transmitted to the remote computer.

6. The method of claim 1 additionally comprising comparing the change in corrected volume to the volume of liquid added to the tank, if any.

7. The method of claim 1 additionally comprising monitoring the site of the liquid dispensing system for a change in a factor external to the tank including either a change in the height of the water table, a change in product, or a seismic event.

8. The method of claim 7 additionally comprising strapping the tank to provide a table of corrections for the discrepancy between calculated volume and actual volume.

9. The method of claim 8 additionally comprising re-strapping the tank in the event of a change in a factor external to the tank.

10. The method of claim 2 wherein the table of corrections includes a correction for the effect of the flattening of the bottom of the tank on the volume of the liquid in the tank.

11. The method of claim 1 additionally comprising verifying that any change in the volume of liquid in the tank which represents a decrease in the liquid in the tank is the result of the pumping of liquid through the dispenser.

12. The method of claim 1 wherein the predetermined limit is 1%±4 gallons per day.

* * * * *